(12) United States Patent
Iwamoto et al.

(10) Patent No.: US 8,088,835 B2
(45) Date of Patent: Jan. 3, 2012

(54) METHOD FOR PRODUCING EXPANSION-MOLDED POLYPROPYLENE-BASED RESIN ARTICLE

(75) Inventors: Tomonori Iwamoto, Osaka (JP); Takayuki Gouda, Osaka (JP)

(73) Assignee: Kaneka Corporation, Osaka (JP)

( * ) Notice: Subject to any disclaimer, the term of this patent is extended or adjusted under 35 U.S.C. 154(b) by 468 days.

(21) Appl. No.: 11/659,674

(22) PCT Filed: Jul. 27, 2005

(86) PCT No.: PCT/JP2005/013703
§ 371 (c)(1),
(2), (4) Date: Feb. 7, 2007

(87) PCT Pub. No.: WO2006/016478
PCT Pub. Date: Feb. 16, 2006

(65) Prior Publication Data
US 2007/0270516 A1 Nov. 22, 2007

(30) Foreign Application Priority Data
Aug. 11, 2004 (JP) ................................ 2004-234652

(51) Int. Cl.
*B29C 44/34* (2006.01)
*C08F 110/00* (2006.01)
*C08F 210/00* (2006.01)
*C08J 9/16* (2006.01)
*C08J 9/22* (2006.01)

(52) U.S. Cl. .......... 521/142; 521/143; 521/144; 521/57; 521/56; 264/51

(58) Field of Classification Search .................. 521/142, 521/143, 144, 57, 56; 264/51
See application file for complete search history.

(56) References Cited

U.S. PATENT DOCUMENTS

| 4,440,703 | A | * | 4/1984 | Akiyama et al. | ................ | 264/50 |
| 4,676,939 | A | * | 6/1987 | Kuwabara | ........................ | 264/50 |
| 5,430,069 | A | * | 7/1995 | Ogita et al. | ..................... | 521/60 |
| 6,077,875 | A | * | 6/2000 | Sasaki et al. | ..................... | 521/60 |
| 6,607,682 | B1 | * | 8/2003 | Yamaguchi et al. | ............ | 264/51 |
| 6,818,161 | B2 | * | 11/2004 | Tokoro et al. | ................ | 264/45.4 |
| 2003/0034580 | A1 | * | 2/2003 | Sasaki et al. | ..................... | 264/51 |
| 2004/0054042 | A1 | * | 3/2004 | Iwamoto et al. | ............... | 524/100 |
| 2004/0151879 | A1 | * | 8/2004 | Yokoyama et al. | ........... | 428/158 |
| 2005/0153134 | A1 | * | 7/2005 | Sasaki et al. | ................... | 428/402 |

FOREIGN PATENT DOCUMENTS

| EP | 1 055 700 | 11/2000 |
| JP | 3-224727 | 10/1991 |
| JP | 7-138399 | 5/1995 |
| JP | 7-138400 | 5/1995 |
| JP | 10-316791 | 12/1998 |
| JP | 2000-302909 | 10/2000 |
| JP | 2000302909 | * 10/2000 |
| JP | 2001-328132 | 11/2001 |

OTHER PUBLICATIONS

International Search Report for the corresponding PCT/JP2005/013703, mailed Oct. 25, 2005.
English Translation of International Preliminary Report on Patentability, 2007.

* cited by examiner

*Primary Examiner* — Vasu Jagannathan
*Assistant Examiner* — Irina Krylova
(74) *Attorney, Agent, or Firm* — Hamre, Schumann, Mueller & Larson, P.C.

(57) ABSTRACT

It is an object of the present invention to provide a method for easily and economically producing an expansion-molded polypropylene-based resin article stably with a high porosity, that has continuous voids and that can be used as materials such as a sound absorbing material and a draining material. More specifically, the present invention relates to a method for producing an expansion-molded polypropylene-based resin article, in which a mold is filled with expanded polypropylene-based resin particles, and the expanded particles are heated and fused using water vapor, and then cooled, wherein expanded polypropylene-based resin particles are used in which a polypropylene-based resin having a melt index (MI) of not less than 0.1 g/10 minutes and not more than 9 g/10 minutes is used as a base resin, a cell size is not more than 150 µm, two melting peaks are present on a DSC curve obtained by differential scanning calorimetry, and $\beta/(\alpha+\beta)$ is not less than 0.35 and not more than 0.75 when taking a melting calorie at the lower temperature peak as $\alpha$ (J/g) and taking a melting calorie at the higher temperature peak as $\beta$ (J/g), and a porosity of an obtained molded article is not less than 20% and not more than 50%.

3 Claims, 1 Drawing Sheet

METHOD FOR PRODUCING EXPANSION-MOLDED POLYPROPYLENE-BASED RESIN ARTICLE

This application is a national stage application from the Intiernational Patent Application No. PCT/JP2005/013703 filed Jul. 27, 2005, and claims the foreign priority over the Japanese Patent Application No. 2004-234652 filed Aug. 11, 2004.

TECHNICAL FIELD

The present invention relates to methods for producing an expansion-molded polypropylene-based resin article that can be used mainly as a sound absorbing material and a draining material and that is obtained by molding expanded polypropylene-based resin particles.

BACKGROUND ART

As a method for producing an expansion-molded polypropylene-based resin article that is obtained by molding expanded polypropylene-based resin particles and that has continuous voids (voids in communication with each other), Patent Document 1 has disclosed a method in which a mold is filled with pillar-shaped expanded polyolefin-based resin particles having a specific crystal structure observed by differential scanning calorimetry and having an L/D of 2 to 10, the filling being performed such that the filling rate is 40 to 55% and that the particles are oriented in irregular directions, and then heating is performed with vapor having a temperature within a range from a temperature that is 20° C. lower than the Vicat softening point of a base resin to the melting point.

However, with this method, it is difficult to stably obtain an expansion-molded polypropylene-based resin article with a high porosity, and the porosity is limited to up to 20%. Moreover, achieving a high porosity becomes more difficult as the expansion ratio increases. Thus, this method has poor practicability.

In order to address this problem, Patent Document 2 and Patent Document 3 have disclosed methods for hot-molding expanded polypropylene-based resin particles having a specific shape. The techniques disclosed herein are characterized by using expanded polypropylene-based resin particles that have a hollow cylindrical shape or hollow deformed shapes, or that have a cross-sectional shape with recesses and projections, such as a cross. In order to produce these deformed expanded polypropylene-based resin particles, it is necessary to produce resin particles corresponding thereto. However, production of these resin particles is complicated, resulting in a low productivity of the resin particles having a particle size of 1 to 10 mg/particle, which is the size of expanded polypropylene-based resin particles generally used for foam molding within a mold. Thus, these methods have an economical disadvantage.

Furthermore, in Patent Document 4, the present inventors have disclosed an expansion-molded article having a porosity of 10 to 60%, obtained by using Japanese hand drum-shaped (similar to the shape of an hourglass) expanded particles. According to the technique disclosed herein, the drum-shaped expanded particles are produced from ordinary pillar-shaped resin particles, and then an expansion molded article having a high porosity is produced using the drum-shaped expanded particles. Since common pillar-shaped resin particles are used, this technique does not have an economical disadvantage when producing resin particles. When expanded particles are produced by impregnating resin particles with an expanding agent for a short time, Japanese hand drum-shaped expanded particles are obtained. Herein, a conceivable reason why the expanded particles have a Japanese hand drum-shape is that there is a difference in the amount of the expanding agent impregnated into the resin particles between the end portions and the center portion. Probably due to this factor, a variation in the expansion ratio tends to increase, and thus a variation in the expansion ratio of the expansion-molded article tends to increase.

[Patent Document 1] JP H03 (1991)-224724A
[Patent Document 2] JP H07 (1995)-138399A
[Patent Document 3] JP H07 (1995)-138400A
[Patent Document 4] JP 2000-302909A

DISCLOSURE OF INVENTION

Problem to be Solved by Invention

Thus, it is an object of the present invention to provide a method for stably producing an expansion-molded polypropylene-based resin article with a small variation in the expansion ratio and a high porosity, using expanded polypropylene-based resin particles that easily and economically can be produced.

Means for Solving Problem

The present inventors had conducted an in-depth study in order to address the above-described problem, and found that when using expanded polypropylene-based resin particles (hereinafter, also referred to as "expanded particles") that contain a polypropylene-based resin having a specific MI as the base resin and that have a specific cell size and crystal condition, it is possible to obtain an expansion-molded polypropylene-based resin article (hereinafter, also referred to as an "expansion-molded article") with a high porosity very stably, and thus the present invention has been achieved.

More specifically, as a first aspect, the present invention relates to a method for producing an expansion-molded polypropylene-based resin article, in which a mold is filled with expanded polypropylene-based resin particles, and the expanded particles are heated and fused using water vapor, and then cooled, wherein expanded polypropylene-based resin particles are used in which a polypropylene-based resin having a melt index (MI) of not less than 0.1 g/10 minutes and not more than 9 g/10 minutes is used as a base resin, a cell size is not more than 150 μm, two melting peaks are present on a DSC curve obtained by differential scanning calorimetry, and $\beta/(\alpha+\beta)$ is not less than 0.35 and not more than 0.75 when taking a melting calorie at the lower temperature peak as $\alpha$ (J/g) and taking a melting calorie at the higher temperature peak as $\beta$ (J/g), and a porosity of an obtained molded article is not less than 20% and not more than 50%.

Preferred embodiments of the method for producing the expansion-molded polypropylene-based resin article include the following:

(1) the method for producing an expansion-molded polypropylene-based resin article, in which a mold is filled with expanded polypropylene-based resin particles, and the expanded particles are heated and fused using water vapor, and then cooled, wherein expanded polypropylene-based resin particles are used in which a polypropylene-based resin having a melt index (MI) of not less than 0.1 g/10 minutes and not more than 9 g/10 minutes is used as a base resin, the shape thereof is a pillar shape with an L/D of not less than 1.5 and not more than 3, a cell size is not more than 150 μm, two melting peaks are present on a DSC curve obtained by differential scanning calorimetry, and $\beta/(\alpha+\beta)$ is not less than 0.35 and not more than 0.75 when taking a melting calorie at the lower temperature peak as $\alpha$ (J/g) and taking a melting calorie at the higher temperature peak as $\beta$ (J/g), and a porosity of an obtained molded article is not less than 20% and not more than 50%;

(2) the method for producing an expansion-molded polypropylene-based resin article, wherein a mold is filled with expanded polypropylene-based resin particles to which an internal pressure of not less than 0.2 kgf/cm$^2$·G and not more than 0.7 kgf/cm$^2$·G is applied; and (3) the method for producing an expansion-molded polypropylene-based resin article, wherein when heating and fusing the expanded particles, water vapor is used having a temperature within a range from a temperature that is 25° C. lower than the melting point of the expanded polypropylene-based resin particles to the melting point.

Effect of Invention

According to the present invention, an expansion-molded article in which the porosity is 20% or more and 50% or less easily and economically can be produced with a small variation in the expansion ratio and a stable porosity. This expansion-molded article preferably can be used as materials such as a sound absorbing material and a draining material in, for example, automotive materials, construction/building materials, and industrial materials. In particular, the expansion-molded article is useful in providing automotive materials such as a spacer, a tibia pad, a luggage box, and a side impact material, with a sound absorbing ability.

DESCRIPTION OF THE INVENTION

A polypropylene-based resin of the present invention preferably is a resin having a high stereoregularity, that is obtained by polymerization with a Ziegler type titanium chloride-based catalyst or metallocene catalyst, and that is a polymer having a propylene monomer unit of 50 wt % or more, preferably 80 wt % or more, and more preferably 90 wt % or more. Specific examples thereof include a propylene homocopolymer, an ethylene-propylene random copolymer, a propylene-butene random copolymer, an ethylene-propylene-butene random copolymer, an ethylene-propylene block copolymer, a maleic anhydride-propylene random copolymer, a maleic anhydride-propylene block copolymer, and a propylene-maleic anhydride graft copolymer. These polypropylene-based resins may be used alone or in combination. In particular, an ethylene-propylene random copolymer, a propylene-butene random copolymer, and an ethylene-propylene-butene random copolymer preferably can be used. These polypropylene-based resins preferably are non-crosslinked, but may be crosslinked.

The polypropylene-based resin used in the present invention has a melt index (hereinafter, referred to as "MI") of 0.1 g/10 minutes or more and 9 g/10 minutes or less, and more preferably 2 g/10 minutes or more and 8 g/10 minutes or less, the MI being measured at a temperature of 230° C. and with a load of 2.16 kg following JIS K7210. If the MI is less than 0.1 g/10 minutes, then the expandability during production of expanded particles is low, and thus it is difficult to obtain expanded particles with a high expansion ratio. Furthermore, it is difficult to secure the fusing strength between expanded particles in the expansion-molded article. If the MI is more than 9 g/10 minutes, then it is difficult to control the porosity to a stable value in the expansion-molded article.

Furthermore, in order to obtain an expansion-molded article that is excellent in mechanical strength and thermal resistance, the melting point of the polypropylene-based resin preferably is 130° C. or more and 168° C. or less, more preferably 135° C. or more and 160° C. or less, and particularly preferably 140° C. or more and 155° C. or less. If the melting point is within this range, then balancing the moldability with the mechanical strength and the thermal resistance tends to be easy. Herein, the melting point refers to a peak temperature of an endothermic peak on the DSC curve obtained when raising the temperature of 1 to 10 mg of polypropylene-based resin from 40° C. to 220° C. at a rate of 10° C./minute, then lowering the temperature to 40° C. at a rate of 10° C./minute, and again raising the temperature to 220° C. at a rate of 10° C./minute, using a differential scanning calorimeter.

In the expanded particles used in the present invention, it is necessary that the polypropylene-based resin is contained as the base resin, that the cell size is 150 μm or less, that two melting peaks are present on the DSC curve obtained in the differential scanning calorimetry, and that when taking the melting calorie at the lower temperature peak as $\alpha$ (J/g) and taking the melting calorie at the higher temperature peak as $\beta$ (J/g), $\beta/(\alpha+\beta)$ is 0.35 or more and 0.75 or less. When all of these conditions are satisfied, it is possible to produce an expansion-molded polypropylene-based resin article easily, economically, and stably with a small variation in the expansion ratio and a high porosity.

There is no specific limitation regarding the shape of the expanded particles used in the present invention, but it preferably is a pillar shape with an L/D of 1.5 or more and 3 or less. Herein, as shown in FIG. 1, L refers to the length at the longest portion of a expanded particle, and D refers to the average value of Dmax and Dmin when taking the maximum diameter as Dmax and taking the minimum diameter as Dmin on a cross section that is perpendicular to the direction L. The average value D is calculated using the following formula.

$$D = \frac{D\max + D\min}{2} \quad \text{[Formula 1]}$$

The shape of the cross section that is perpendicular to the direction L is a closed curve without a recess, such as circle and ellipse. The values of Dmax and Dmin substantially are constant along the direction L. Specific examples of the pillar shape of the expanded particles include circular cylinder and elliptic cylinder.

If the L/D is 1.5 or more and 3 or less, then when a mold is filled with the expanded particles for molding, an appropriate contact area is kept between the expanded particles, and thus it tends to be easy to form more voids. If the L/D is less than 1.5, then it may be difficult to obtain an expansion-molded article having a sufficient porosity when a mold is filled. If the L/D is more than 3, then a filling port is clogged easily when a mold is filled, and thus filling instabilities are caused, or a variation in the porosity tends to be caused easily between locations in the expansion-molded article.

Furthermore, the cell size of the expanded particles used in the present invention is 150 μm or less. The upper limit of the cell size preferably is 100 μm. There is no specific limitation regarding the lower limit, but the cell size preferably is 20 μm or more, and more preferably 50 μm or more. If the cell size is within this range, then it is easy to fuse between the expanded particles firmly while keeping voids generated when filling a mold. If the cell size is too small, then sinking and shrinkage easily occur when molding an expansion-molded article, and thus the shape retention properties may be deteriorated. If the cell size is more than 150 μm, then the porosity is lowered when molding an expansion-molded article, and in particular, the porosity may be lowered at a surface layer that is in contact with the mold face.

Furthermore, the expanded particles used in the present invention have two melting peaks on the DSC curve obtained by differential scanning calorimetry, and when taking the melting calorie at the lower temperature peak among the two melting peaks as α (J/g) and taking the melting calorie at the higher temperature peak as β (J/g), β/(α+β) is 0.35 or more and 0.75 or less, and preferably 0.40 or more and 0.65 or less. If β/(α+β) is less than 0.35, then it is difficult to make the porosity of the expansion-molded article high. Probably, the reason for this is that the secondary expandability of the expanded particles increases, lowering the porosity during molding. If β/(α+β) is more than 0.75, then it is difficult to fuse between the expanded particles. When the temperature of vapor used for molding is raised in order to facilitate fusing, the porosity of the expansion-molded article is lowered, and thus it is difficult to satisfy both of securing the porosity and causing fusion.

Herein, the DSC curve obtained in the differential scanning calorimetry on expanded particles refers to the DSC curve obtained when raising the temperature of 1 to 10 mg of expanded particles from 40° C. to 220° C. at a programming rate of 10° C./minute using a differential scanning calorimeter. As shown in FIG. 2, on the obtained DSC curve, a tangential point between a straight line passing through a local maximum A and the DSC curve on the lower temperature side is taken as B, and a tangential point therebetween on the higher temperature side is taken as C. The melting calorie α (J/g) at the lower temperature peak can be calculated as the area enclosed by the line segment AB and the DSC curve. The melting calorie β (J/g) at the higher temperature peak can be calculated as the area enclosed by the line segment AC and the DSC curve.

When expanded particles that satisfy the above-described conditions are used, an expansion-molded article with a porosity of 20% or more and 50% or less easily can be obtained. The porosity of the expansion-molded article strongly affects the sound absorbing properties. The porosity is 20% or more and 50% or less, and more preferably 25% or more and 45% or less. If the porosity is less than 20%, then the sound absorption coefficient at the peak frequency is lowered, and thus sufficient sound absorbing properties cannot be obtained. If the porosity is more than 50%, then the contact area between the expanded particles becomes smaller, and thus the expansion-molded article easily cracks, and moreover the mechanical strength is lowered, so that the expansion-molded article cannot be used practically.

The following is a description concerning a method for producing the expanded polypropylene-based resin particles of the present invention. The polypropylene-based resin is processed into resin particles with a weight of 0.2 to 10 mg/particle, and preferably 0.5 to 6 mg/particle, by using known methods, for example, melting the polypropylene-based resin with extruders, kneaders, Banbury mixers™, or rolls. Usually, the polypropylene-based resin is molten using an extruder, and then the resin particles are produced using the strand cutting method or the underwater cutting method. For example, when using the strand cutting method, the polypropylene-based resin that has been extruded from a circular die in the form of a strand is cooled and solidified, for example, with water or air, and then is cut, and thus resin particles are obtained in a desired form.

When pillar-shaped expanded particles are obtained, a heating process during production of the expanded particles from resin particles reduces residual strain in the pillar-shaped resin particles, and thus shrinkage is caused in the stretching direction. Accordingly, when producing pillar-shaped resin particles, it is preferable to take shrinkage in the stretching direction into consideration such that the resin particles have the shape with which expanded particles with a target L/D can be obtained. More specifically, the resin particles preferably have an L/D that is larger than the target L/D of the expanded particles. It may not be necessary to prescribe the precise L/D of resin particles that are to be produced, because it varies depending on the MI of a polypropylene-based resin that is used, the molecular weight distribution, and the stretching degree during production of the resin particles, but the L/D of the resin particles preferably is approximately 4 or more and 9 or less.

When producing the resin particles, the cell size of the expanded particles is adjusted to a desired value by adding a cell nucleating agent. As the cell nucleating agent, inorganic nucleating agents such as talc, calcium carbonate, silica, kaolin, titanium oxide, bentonite, or barium sulphate generally is used. It is not necessarily possible to prescribe the amount of the cell nucleating agent added, because it varies depending on the type of the polypropylene-based resin that is used and the type of the cell nucleating agent, but the amount of the cell nucleating agent added is approximately 0.001 to 2 weight parts with respect to 100 weight parts of the polypropylene-based resin.

Furthermore, during production of the resin particles, various additives may be added if necessary, as long as that the properties of the polypropylene-based resin are not impaired. Examples of the additives include: coloring agents such as carbon black and organic pigment; antistatic agents comprising nonionic surfactants such as alkyl diethanolamide, alkyl diethanolamine, hydroxyalkyl ethanolamine, monoglyceride of fatty acid, diglyceride of fatty acid; hindered phenol-based antioxidants such as IRGANOX1010™, IRGANOX1076™, IRGANOX1330™, IRGANOX1425WL™, IRGANOX3114™, and ULTRANOX626™; phosphorus-based processing stabilizers such as IRGAFOS168™, IRGAFOS P-EPQ™, IRGAFOS126™, and WESTON619™; lactone-based processing stabilizers such as HP-136 ™; hydroxylamine-based processing stabilizers such as FS042™; metal deactivators such as IRGANOX MD1024™; benzotriazole-based ultraviolet absorbers such as TINUVIN326™ and TINUVIN327™; benzoate-based photostabilizers such as TINUVIN120™; hindered amine-based photostabilizers such as CHIMASSORB119™, CHIMASSORB944™, TINUVIN622™, and TINUVIN770™; halogen-based flame retardants and flame retardant aids such as antimony trioxide; non-halogen-based flame retardants such as FLAMESTAB NOR116 ™ and MELAPUR MC25™; antacids such as hydrotalcite and calcium stearate; crystal nucleation agents such as IRGASTAB NA11™; and lubricants such as erucic acid amide and stearamide.

Conventionally known methods can be used for producing the expanded particles of the present invention. For example, the expanded particles are produced using the following method. An aqueous dispersion medium containing the resin particles, the expanding agent, the dispersing agent, and the dispersing aid is put in a sealed container, the temperature is raised to a predetermined temperature (hereinafter, may be referred to as an "expanding temperature") while the dispersion medium is agitated, and the resin particles are impregnated with the expanding agent. The expanding agent further is added if necessary, and the pressure inside the sealed container is kept at a predetermined pressure (hereinafter, may be referred to as an "expanding pressure"), and then contents are released from the lower portion of the sealed container to a pressure atmosphere lower than the internal pressure of the sealed container. There is no specific limitation regarding the sealed container that is used, and any container can be used as long as it can resist the pressure inside the container and the temperature inside the container during production of the expanded particles. Examples thereof include an autoclave pressure resistant container.

Examples of the expanding agent include: aliphatic hydrocarbons such as propane, isobutane, normal butane, isopentane, and normal pentane, and mixtures thereof, inorganic gases such as air, nitrogen, and carbon dioxide; and water. In order to obtain expanded particles with a higher expansion ratio, it is preferable to use isobutane, and normal butane, and mixtures thereof as the expanding agent. In order to obtain expanded particles with a small variation in the expansion ratio at a low expansion ratio, it is preferable to use water as the expanding agent.

In a case where water is used as the expanding agent, it is preferable to add a water absorbing agent such as sodium ionomer, potassium ionomer, melamine, and isocyanuric acid, when producing the resin particles.

It may not be necessary to prescribe the precise amount of the expanding agent used, because it varies depending on factors such as the type of the polypropylene-based resin that is used, the type of the expanding agent, and a target expansion ratio, but the amount of the expanding agent used is approximately 2 to 60 weight parts with respect to 100 weight parts of the polypropylene-based resin.

As the dispersing agent, for example, poorly water-soluble inorganic compounds such as basic tricalcium phosphate, basic magnesium carbonate, calcium carbonate, and aluminum oxide can be used. As the dispersing aid, for example, anionic surfactants such as sodium dodecylbenzenesulfonate and sodium linear alkylsulfonate can be used. Among these, it is preferable to use basic tricalcium phosphate or sodium linear alkylsulfonate in order to obtain a good dispersibility. The amounts of these dispersing agent and dispersing aid used vary depending on factors such as the types thereof, the type/amount of the polypropylene-based resin and the type of the expanding agent that are used, but usually, the amount of the dispersing agent used preferably is 0.1 weight parts or more and 3 weight parts or less, and the amount of the dispersing aid used preferably is 0.0001 weight parts or more and 0.1 weight parts or less, with respect to 100 weight parts of water.

Furthermore, in order to achieve a good dispersibility of the resin particles into water, usually, the amount of the resin particles used preferably is 20 weight parts or more and 100 weight parts or less with respect to 100 weight parts of water.

The temperature of the aqueous dispersion of the polypropylene-based resin particles adjusted inside the sealed container in this manner is raised to a predetermined expanding temperature while the aqueous dispersion is agitated, and the aqueous dispersion is kept for a predetermined period, preferably five minutes or more and 180 minutes or less, and more preferably 10 minutes or more and 60 minutes or less, the pressure inside the sealed container increases, and the expanding agent is impregnated into the resin particles. Then, the expanding agent further is added until a predetermined expanding pressure is obtained, and the aqueous dispersion is kept for a predetermined period, preferably five minutes or more and 180 minutes or less, and preferably 10 minutes or more and 60 minutes or less. The aqueous dispersion of the polypropylene-based resin particles that has been kept at the expanding temperature and the expanding pressure is released in a low pressure atmosphere (usually, in an atmospheric pressure) by opening a valve that is provided at the lower portion of the sealed container, and thus expanded polypropylene-based resin particles can be produced.

When the aqueous dispersion of the resin particles is released to a low pressure atmosphere, releasing may be performed through an opening orifice having 2 to 10 mm $\phi$ in order to adjust the flow rate, and to reduce a variation in the expansion ratio, for example. Furthermore, the low pressure atmosphere may be filled with saturated water vapor in order to increase the expansion ratio.

It may not be necessary possible to prescribe the precise expanding temperature, because it varies depending on factors such as the melting point [Tm (° C.)] of the polypropylene-based resin and the type of the expanding agent that are used, but the expanding temperature is determined within a range approximately from Tm−30 (° C.) to Tm+10 (° C.). Furthermore, it may not be necessary possible to prescribe the precise expanding pressure, because it varies depending on the type of the polypropylene-based resin and the type of the expanding agent that are used, and a desired expansion ratio of the expanded particles, but the expanding pressure is determined within a range approximately from 1 MPa to 8 MPa (gauge pressure).

It is possible to adjust the value of $\beta/(\alpha+\beta)$ of the expanded particles, calculated based on the DSC curve, by adjusting the expanding temperature. Generally, $\beta/(\alpha+\beta)$ is lowered if the expanding temperature is increased, and $\beta/(\alpha+\beta)$ is increased if the expanding temperature is lowered. However, when aliphatic hydrocarbon is used as the expanding agent, the melting point of the polypropylene-based resin is lowered by a plasticizing effect, and thus the value of $\beta/(\alpha+\beta)$ is affected by the impregnation amount of the expanding agent, that is, the expanding pressure. Accordingly, the value of $\beta/(\alpha+\beta)$ is adjusted by adjusting the expanding temperature and the expanding pressure. $\beta/(\alpha+\beta)$ is lowered if the expanding pressure is increased, and $\beta/(\alpha+\beta)$ is increased when the expanding pressure is lowered.

From the thus obtained expanded polypropylene-based resin particles, an expansion-molded polypropylene-based resin article with a porosity of 20% or more and 50% or less can be molded using conventionally known molding methods. Examples of the available methods include A) a method in which the expanded particles are impregnated with inorganic gas by being pressurized with the inorganic gas, a predetermined internal pressure of the expanded particles is applied thereto, a mold is filled with the expanded particles, and heating and fusing are performed with water vapor, B) a method in which a mold is filled with the expanded particles that have been compressed with the gas pressure, and heating and fusing are performed with water vapor using the recovery force of the expanded particles, and C) a method in which a mold is filled with the expanded particles without any pretreatment, and heating and fusing are performed with water vapor.

Among these molding methods, it is preferable to use the method in which the expanded particles are impregnated with inorganic gas by being pressurized with the inorganic gas, a predetermined internal pressure of the expanded particles is applied thereto, a mold is filled with the expanded particles, and heating and fusing are performed with water vapor. Herein, the internal pressure of the expanded particles more preferably is 0.2 kgf/cm$^2$·G or more and 0.7 kgf/cm$^2$·G or less. If the internal pressure of the expanded particles is 0.2 kgf/cm$^2$·G or more and 0.7 kgf/cm$^2$·G or less, then the porosity can be controlled more easily, and thus an expansion-molded article with a porosity of 20% or more and 50% or less more stably can be produced.

As the inorganic gas, it is possible to use air, nitrogen, oxygen, helium, neon, argon, and carbon dioxide gas, for example. These gases may be used alone or in combination of two or more. Among these, air and nitrogen, which are generally used, are preferable.

According to the present invention, a molded article is obtained by heating and fusing expanded particles using water vapor. If the temperature of the water vapor at that time is too low, then fusing becomes insufficient, and thus the form as the expansion-molded article cannot be kept. On the contrary, if the temperature of the water vapor is too high, then the porosity of the expansion-molded article is lowered, and thus the sound absorbing ability tends to be deteriorated. In order to satisfy both of the fusing properties between expanded particles and the porosity, when taking the melting point of the polypropylene-based resin that is used as the base resin as Tm (° C.), it is preferable to use water vapor with a temperature within a range from a temperature that is 25° C. lower than the melting point to the melting point, and it is more preferable to use water vapor with a temperature within a range from a temperature that is 20° C. lower than the melting point to a temperature that is lower by 5° C. than the melting point, while heating and fusing the expanded particles.

EXAMPLES

Next, the method for producing an expansion-molded polypropylene-based resin article having continuous voids of the present invention is described in more detail based on Examples and Comparative Examples. Table 1 shows the characteristics of base resins that are used. Table 2 shows production conditions when producing expanded particles, and the characteristics of the obtained expanded particles. Table 3 shows molding conditions when molding expanded particles, and the characteristics of the obtained expansion-molded article.

TABLE 1

| base resin | MI (g/10 min.) | melting point (° C.) | ethylene content (wt %) | butene content (wt %) |
| --- | --- | --- | --- | --- |
| PP-A | 4.5 | 144 | 2.8 | 1.3 |
| PP-B | 7 | 146 | 2.3 | 1.7 |
| PP-C | 3 | 150 | 2.1 | 0 |
| PP-D | 0.5 | 141 | 3.2 | 0 |
| PP-E | 10 | 147 | 2.4 | 0 |

Examples 1 to 3

PP-A listed in Table 1 was used as a base resin, 300 ppm of talc was added thereto as a cell nucleating agent, and the obtained material was molten and kneaded inside an extruder. Then, the obtained material was extruded in the form of a strand from a circular die, cooled with water, and then cut with a cutter, and thus resin particles having a weight of 1.8 mg/particle, the shape of a substantially circular cylinder, and the L/Ds listed in Table 2 were obtained.

100 weight parts (65 kg) of the obtained resin particles, 200 weight parts of water, 0.5 weight parts of basic tricalcium phosphate, and 0.01 weight parts of sodium alkylsulfonate were placed in a pressure resistant autoclave having a capacity of 0.35 m³, and while these materials were agitated, 16 weight parts of isobutene was added as an expanding agent. Then, the temperature was raised so that the materials inside the autoclaves were heated to the expanding temperatures listed in Table 2. Next, isobutane further was injected, and the pressure was increased to the expanding pressures listed in Table 2. After these materials were kept for 30 minutes at the expanding temperatures and the expanding pressures, then the materials in the autoclaves were released in an atmospheric pressure through opening orifices having 4.4 mm ϕ by opening a valve provided at the lower portion of the autoclave, and thus expanded particles were obtained. Table 2 shows the characteristics of the obtained expanded particles.

The obtained expanded particles were impregnated with air by being pressurized with the air, and the internal pressures listed in Table 3 were applied thereto, molds with a size of 320×320×60 mm were filled with the expanded particles, and heating and fusing were performed with vapor having the molding temperatures listed in Table 3, and thus expansion-molded articles were obtained. Table 3 shows the characteristics of the obtained expansion-molded articles.

TABLE 2

| | | characteristics of resin particles | | | expanding conditions | | characteristics of expanded particles | | | |
| --- | --- | --- | --- | --- | --- | --- | --- | --- | --- | --- |
| | | base resin | MI (g/10 min.) | resin particle L/D | expanding temperature (° C.) | expanding pressure (MPa) | expanded particle L/D | cell size (μm) | β/(α + β) | bulk density (g/cm³) |
| Ex. | 1 | PP-A | 4.5 | 6.3 | 135 | 2.20 | 2.1 | 103 | 0.40 | 0.019 |
| | 2 | PP-A | 4.5 | 6.3 | 131 | 2.10 | 2.7 | 66 | 0.62 | 0.032 |
| | 3 | PP-A | 4.5 | 8.2 | 136 | 2.15 | 2.9 | 108 | 0.40 | 0.022 |
| | 4 | PP-A | 4.5 | 6.3 | 136 | 2.15 | 2.6 | 140 | 0.46 | 0.026 |
| | 5 | PP-B | 7 | 6.5 | 132 | 2.45 | 2.3 | 80 | 0.38 | 0.033 |
| | 6 | PP-C | 3 | 6.4 | 139 | 2.16 | 2.3 | 93 | 0.52 | 0.023 |
| | 7 | PP-D | 0.5 | 6.7 | 130 | 2.68 | 2.2 | 68 | 0.41 | 0.048 |
| | 8 | PP-A | 4.5 | 6.3 | 135 | 2.20 | 2.1 | 103 | 0.40 | 0.019 |
| | 9 | PP-A | 4.5 | 6.3 | 135 | 2.20 | 2.1 | 103 | 0.40 | 0.019 |
| | 10 | PP-A | 4.5 | 6.3 | 135 | 2.20 | 2.1 | 103 | 0.40 | 0.019 |
| | 11 | PP-A | 4.5 | 6.3 | 135 | 2.20 | 2.1 | 103 | 0.40 | 0.019 |
| | 12 | PP-A | 4.5 | 9.2 | 136 | 2.15 | 3.8 | 98 | 0.48 | 0.020 |
| Com. Ex. | 1 | PP-A | 4.5 | 2.0 | 142 | 1.72 | 1.0 | 220 | 0.26 | 0.019 |
| | 2 | PP-A | 4.5 | 6.3 | 131 | 2.51 | 2.5 | 62 | 0.85 | 0.035 |

TABLE 2-continued

| | | characteristics of resin particles | | expanding conditions | | characteristics of expanded particles | | | |
|---|---|---|---|---|---|---|---|---|---|
| | base resin | MI (g/10 min.) | resin particle L/D | expanding temperature (°C.) | expanding pressure (MPa) | expanded particle L/D | cell size (μm) | $\beta/(\alpha+\beta)$ | bulk density (g/cm$^3$) |
| 3 | PP-E | 10 | 1.8 | 144 | 1.82 | 1.1 | 262 | 0.22 | 0.028 |
| 4 | PP-E | 10 | 6.3 | 142 | 1.98 | 2.1 | 222 | 0.30 | 0.026 |
| 5 | PP-E | 10 | 6.3 | 138 | 2.10 | 2.3 | 140 | 0.42 | 0.028 |

TABLE 3

| | | molding conditions | | characteristics of expansion-molded article | | | | | | | |
|---|---|---|---|---|---|---|---|---|---|---|---|
| | | expanded particles internal pressure (kgf/cm$^2$G) | molding temperature (°C.) | porosity average (%) | variation | apparent density average (g/cm$^3$) | variation | shape fusing property | retention property | sound absorption peak frequency (Hz) | peak sound absorption coefficient |
| Ex. | 1 | 0.4 | 134 | 35 | 0.6 | 0.021 | 3.3 × 10$^{-4}$ | B | A | 4200 | 0.99 |
| | 2 | 0.5 | 136 | 36 | 0.6 | 0.035 | 3.1 × 10$^{-4}$ | B | A | 4200 | 0.99 |
| | 3 | 0.4 | 134 | 36 | 0.7 | 0.024 | 4.2 × 10$^{-4}$ | B | A | 4200 | 0.99 |
| | 4 | 0.4 | 134 | 29 | 0.5 | 0.029 | 2.2 × 10$^{-4}$ | B | A | 3800 | 0.90 |
| | 5 | 0.3 | 138 | 26 | 0.6 | 0.036 | 2.4 × 10$^{-4}$ | B | A | 3600 | 0.82 |
| | 6 | 0.5 | 141 | 38 | 0.5 | 0.025 | 2.8 × 10$^{-4}$ | B | A | 4300 | 0.99 |
| | 7 | 0.6 | 138 | 39 | 0.4 | 0.053 | 3.0 × 10$^{-4}$ | B | B | 4300 | 0.99 |
| | 8 | 0.4 | 118 | 40 | 0.6 | 0.024 | 4.2 × 10$^{-4}$ | C | B | 4200 | 0.99 |
| | 9 | 0.4 | 147 | 20 | 0.5 | 0.023 | 2.5 × 10$^{-4}$ | A | A | 4300 | 0.65 |
| | 10 | 0 | 134 | 38 | 0.6 | 0.023 | 2.2 × 10$^{-4}$ | C | A | 4300 | 0.99 |
| | 11 | 1.0 | 134 | 12 | 0.3 | 0.021 | 2.4 × 10$^{-4}$ | A | A | 4300 | 0.35 |
| | 12 | 0.4 | 134 | 38 | 1.3 | 0.022 | 7.8 × 10$^{-4}$ | B | A | 4300 | 0.99 |
| Com. Ex. | 1 | 0.5 | 134 | no void is formed | | 0.021 | 1.8 × 10$^{-4}$ | A | A | no sound absorbency | |
| | 2 | 0.5 | 140 | evaluation is not possible due to breaking caused by deformation or load, although fused at points | | | | | | | |
| | 3 | 0.5 | 136 | no void is formed | | 0.031 | 2.0 × 10$^{-4}$ | A | A | no sound absorbency | |
| | 4 | 0.4 | 136 | 16 | 0.7 | 0.029 | 2.8 × 10$^{-4}$ | B | A | 3200 | 0.45 |
| | 5 | 0.4 | 136 | 20 | 0.7 | 0.031 | 3.0 × 10$^{-4}$ | B | A | 3200 | 0.42 |

Example 4

An expansion-molded article was obtained using the same method as in Example 1, except that 100 ppm of silica was added as the cell nucleating agent during production of the resin particles.

Example 5

An expansion-molded article was obtained using the same method as in Example 1, except that PP-B having an MI of 7 g/10 minutes listed in Table 1 was used as the base resin, and that 1500 ppm of talc was added as the cell nucleating agent.

Example 6

An expansion-molded article was obtained using the same method as in Example 1, except that PP-C having an MI of 3 g/10 minutes listed in Table 1 was used as the base resin, and that 150 ppm of talc was added as the cell nucleating agent.

Example 7

An expansion-molded article was obtained using the same method as in Example 1, except that PP-D having an MI of 0.5 g/10 minutes listed in Table 1 was used as the base resin, and that 100 ppm of talc was added as the cell nucleating agent.

Example 8 to 11

Expansion-molded articles were obtained using the same method as in Example 1, except that PP-A listed in Table 1 was used as the base resin, and that the molding conditions listed in Table 3 were applied.

Example 12

An expansion-molded article was obtained using the same method as in Example 1. As shown in Table 2, expanded particles used for molding had an L/D of 3.8, a cell size of 98 μm, and a value of $\beta/(\alpha+\beta)$ of 0.48. As shown in Table 3, the obtained expansion-molded article had a high porosity, and exhibited a good sound absorbing ability.

Comparative Example 1

An expansion-molded article was obtained using the same method as in Example 1, except that 100 ppm of talc was added as the cell nucleating agent. As shown in Table 2, expanded particles used for molding had an L/D of 1.0, a cell size of 220 μm, and a value of $\beta/(\alpha+\beta)$ of 0.26. The expanded particles had the characteristics of expanded particles generally used in conventional examples, and the obtained expansion-molded article had no void between the expanded particles. Since continuous voids were not present, the expansion-molded article had a normal incidence sound absorption coefficient of 0.1 or less at a frequency of 500 to 6400 Hz, and exhibited no sound absorbing ability.

Comparative Example 2

An expansion-molded article was obtained using the same method as in Example 1. As shown in Table 2, expanded particles used for molding had an L/D of 2.5, a cell size of 62 μm, and a value of β/(α+β) of 0.85. The obtained expansion-molded article could not be used in practice, because it was broken by deformation or load applied when being taken out of the mold or transported, although the expansion-molded article had fused points. Furthermore, an evaluation on the characteristics could not be conducted, because the expansion-molded article was broken also when being cut.

Comparative Example 3

An expansion-molded article was obtained using the same method as in Example 1, except that PP-E having an MI of 10 g/10 minutes listed in Table 1 was used as the base resin, and that 150 ppm of talc was added as the cell nucleating agent. As shown in Table 2, expanded particles used for molding had an L/D of 1.1, a cell size of 262 μm, and a value of β/(α+β) of 0.22. The expanded particles had the characteristics of expanded particles generally used in conventional examples, and the obtained expansion-molded article had no void between the expanded particles. Since continuous voids were not present, the expansion-molded article had a normal incidence sound absorption coefficient of 0.1 or less at a frequency of 500 to 6400 Hz, and exhibited no sound absorbing ability.

Comparative Example 4

An expansion-molded article was obtained using the same method as in Example 1, except that PP-E having an MI of 10 g/10 minutes listed in Table 1 was used as the base resin, and that 150 ppm of talc was added as the cell nucleating agent. As shown in Table 2, expanded particles used for molding had an L/D of 2.1, a cell size of 222 μm, and a value of β/(α+β) of 0.30. As shown in Table 3, the obtained expansion-molded article had a porosity as low as 16%, and a poor sound absorbing ability, where the normal incidence sound absorption coefficient was 0.45.

Comparative Example 5

An expansion-molded article was obtained using the same method as in Example 1, except that PP-E having an MI of 10 g/10 minutes listed in Table 1 was used as the base resin, and that 500 ppm of talc was added as the cell nucleating agent. As shown in Table 2, expanded particles used for molding had an L/D of 2.3, a cell size of 140 μm, and a value of β/(α+β) of 0.42. As shown in Table 3, the obtained expansion-molded article had a porosity as low as 20%, and a poor sound absorbing ability, where the normal incidence sound absorption coefficient was 0.42.

Hereinafter, methods for measuring and evaluating the characteristics of expanded particles and expansion-molded articles.

<Cell Size>

10 expanded particles were taken out in random, and the expanded particles were cut. The cut surfaces of the expanded particles were observed with a magnifying glass (magnification: 60) provided with a 2 mm gauge, and the number of cells on the gauge was counted. The average value of the counted number of cells of the 10 expanded particles was taken as N (pieces), and the cell size was calculated using the following formula.

$$\text{cell size (μm)} = \frac{2000}{N} \quad \text{[Formula 2]}$$

<Bulk Density>

A stainless steel bucket with a capacity of 0.0107 m³ was filled with expanded particles by simply dropping the expanded particles from a position that is higher by approximately 10 cm than the upper end of the bucket. The weight W (g) of the expanded particles used for filling was measured and the bulk density was calculated using the following formula.

$$\text{bulk density (g/cm}^3\text{)} = \frac{W}{0.0107 \times 10^6} \quad \text{[Formula 3]}$$

<Porosity>

The obtained plate-like expansion-molded article with a size of approximately 320×320×60 mm was cut into rectangular solid samples with a size of 20×20×40 mm such that the surface skin layer is not included, and the apparent volume $V_1$ (cm³) was obtained based on the external size. Furthermore, the rectangular solid samples were soaked in a measuring cylinder containing a predetermined amount of ethanol. The increased volume at that time $V_2$ (cm³) was measured, and the porosity was obtained using the following formula.

$$\text{porosity (\%)} = \frac{V_1 - V_2}{V_1} \times 100 \quad \text{[Formula 4]}$$

The average value and the variation in the porosity were obtained using the following formulae, taking, as $X_i$ (i=1 to 5), the porosity of each of the rectangular solid samples cut out from five points in total, namely from four corners and the centroid portion of the plate-like expansion-molded article.

$$\text{average value of porosity (\%)} = \frac{\sum X_i}{5} \quad \text{[Formula 5]}$$

$$\text{unevenness in porosity} = \sqrt{\frac{5\sum X_i^2 - (\sum X_i)^2}{5 \times 4}} \quad \text{[Formula 6]}$$

<Apparent Density>

The obtained plate-like expansion-molded article with a size of approximately 320×320×60 mm was divided into nine rectangular solids with a size of 106×106×60 mm. The average value and the variation in the apparent density were obtained using the following formulae, by obtaining the apparent density $Y_i$ (i=1 to 9) of each of the nine separate rectangular solids based on the external size and the weight.

$$\text{average value of apparent density (\%)} = \frac{\sum Y_i}{9} \quad \text{[Formula 7]}$$

$$\text{unevenness in apparent density} = \sqrt{\frac{9\sum Y_i^2 - (\sum Y_i)^2}{9 \times 8}} \quad \text{[Formula 8]}$$

<Fusing Property>

The obtained plate-like expansion-molded article with a size of approximately 320×320×60 mm was notched (approximately 5 mm) using a cutter knife, and the expansion-molded article was broken by being bent along the notches. The conditions of the broken-out section were observed visually and evaluated based on the following standard.

A: On the broken-out section, the ratio at which the expansion-molded article is broken at the interface between the expanded particles is 40% or less.

B: On the broken-out section, the ratio at which the expansion-molded article is broken at the interface between the expanded particles is more than 40%, but the expanded particles do not fall off.

C: On the broken-out section, the ratio at which the expansion-molded article is broken at the interface between the expanded particles is more than 40%, and the expanded particles fall off. However, the expanded particles do not fall off from a portion other than the broken-out section.

D: On the broken-out section, the ratio at which the expansion-molded article is broken at the interface between the expanded particles is more than 40%, and the expanded particles fall off. Furthermore, the expanded particles fall off also from a portion other than the broken-out section.

<Shape Retention Property>

The length, the width, and the thickness of the obtained plate-like expansion-molded article with a size of approximately 320×320×60 mm were measured, and the shrinkage percentage with respect to the mold size was obtained. Furthermore, it visually was observed whether or not deformation or sinking occurs, and an evaluation was conducted based on the following standard.

A: The shrinkage percentage is 4% or less, and no deformation or sinking is observed.

B: The shrinkage percentage is 4% or less, but slight deformation or sink is observed.

C: The shrinkage percentage is more than 4%, and significant deformation or sinking is observed.

<Sound Absorption Peak Frequency and Peak Sound Absorption Coefficient>

Following JIS A1405, the normal incidence sound absorption coefficient of the sample with a thickness of 12.5 mm was measured at a frequency of 500 to 6400 Hz. The sample was cut out from the obtained expansion-molded article such that the thickness is 12.5 mm and that a face having the surface skin layer serves as a face on which sound waves are incident. The measurement was conducted in a state where the sample was in close contact with a rigid wall that reflects sound waves, that is, a state in which back air is not present. A normal incidence sound absorption coefficient measuring device SR-4100 (manufactured by Ono Sokki) was used for the measurement.

A frequency at which the normal incidence sound absorption coefficient was maximum (sound absorption peak frequency), and the normal incidence sound absorption coefficient at that time (peak sound absorption coefficient) were read from the obtained frequency-normal incidence sound absorption coefficient curve.

INDUSTRIAL APPLICABILITY

Figure 1:
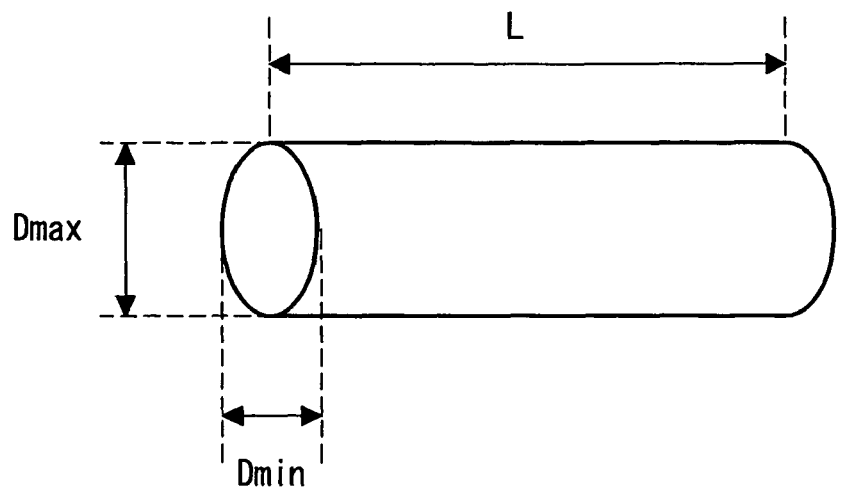
FIG. 1 is a diagram describing the values of L, Dmax, and Dmin used for calculating L/D in an example of expanded particles used in the present invention.
Figure 2:
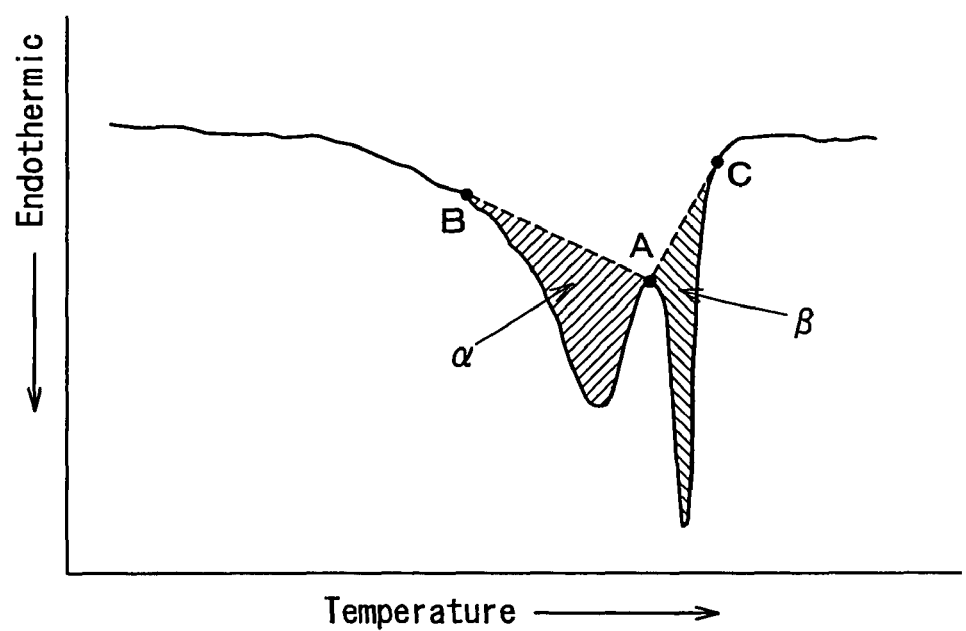
FIG. 2 shows one example of the DSC curve of the expanded particles.

According to the present invention, an expansion-molded article in which the porosity is 20% or more and 50% or less can be produced easily and economically with a small variation in the expansion ratio and a stable porosity. This expansion-molded article preferably can be used as materials such as a sound absorbing material and a draining material in, for example, automotive materials, construction/building materials, and industrial materials. In particular, the expansion-molded article preferably can be used when providing automotive materials such as a spacer, a tibia pad, a luggage box, and a side impact material, with a sound absorbing ability.

The invention claimed is:

1. A method for producing an expansion-molded polypropylene-based resin article, comprising:

filling a mold with expanded polypropylene-based resin particles;

heating and fusing the expanded particles by using water vapor; and then cooling the fused and heated expanded particles, wherein a polypropylene-based resin having a melt index (MI) of not less than 0.1 g/10 minutes and not more than 8 g/10 minutes is used as a base resin for the expanded polypropylene-based resin particles, a shape of the expanded polypropylene-based resin particles is a pillar shape with an L/D ratio of not less than 1.5 and not more than 3, wherein the pillar shape is a shape in which a maximum diameter (Dmax) and a minimum diameter (Dmin) on a cross section perpendicular to a length direction of the expanded polypropylene-based resin particle are substantially constant along the length direction, and the D in the L/D ratio refers to an average value calculated by a following formula:

$$D = \frac{D_{max} + D_{min}}{2},$$

a cell size of the expanded polypropylene-based resin particles is not more than 150 μm, two melting peaks are present on a DSC curve of the expanded polypropylene-based resin particles obtained by differential scanning calorimetry, and $\beta/(\alpha+\beta)$ is not less than 0.35 and not more than 0.75 when taking a melting calorie at the lower temperature peak as $\alpha(J/g)$ and taking a melting calorie at the higher temperature peak as $\beta(J/g)$, the mold is filled with the expanded polypropylene-based resin particles to which an internal pressure of not less than 0.2 kgf/cm$^2$G and not more than 0.7 kgf/cm$^2$G is applied, a porosity of an obtained molded article is not less than 20% and not more than 50%, the obtained molded article has a peak sound absorption coefficient of no lower than 0.82, and continuous voids are formed in the obtained molded article.

2. The method for producing an expansion-molded polypropylene-based resin article according to claim 1, wherein when heating and fusing the expanded polypropylene-based resin particles, water vapor at a temperature in a range from 25° C. lower than a melting point of the polypropylene-based resin that is used as the base resin to the melting point thereof is used.

3. The method for producing an expansion-molded polypropylene-based resin article according to claim 1, wherein the porosity of an obtained molded article is not less than 25% and not more than 45%.

* * * * *